United States Patent [19]

Garin et al.

[11] 4,409,254

[45] Oct. 11, 1983

[54] PROCESS FOR CONCENTRATING AND ISOLATING A BEET COLORANT

[75] Inventors: Torunn A. Garin, Bronxville; Gerald J. Vogel, Tarrytown, both of N.Y.

[73] Assignee: General Foods Corporation, White Plains, N.Y.

[21] Appl. No.: 191,568

[22] Filed: Sep. 29, 1980

[51] Int. Cl.$^3$ .......................... A23L 1/27; A23L 1/277
[52] U.S. Cl. .................................... 426/540; 426/250; 426/431; 426/478; 426/655
[58] Field of Search ............... 426/250, 540, 431, 478, 426/655

[56] References Cited

U.S. PATENT DOCUMENTS 4,027,042   5/1977   Von Elbe et al. .................. 426/540

FOREIGN PATENT DOCUMENTS 1291155   3/1962   France ................................ 426/540
55-42239  5/1980   Japan ................................. 426/540
1559275   1/1980   United Kingdom ................ 426/540

OTHER PUBLICATIONS

Elbe et al., Journal of Food Science, vol. 37, 1972, pp. 932–934, 1972.
Elbe et al., Cereal Science Today, vol. 18, pp. 263–264, 1973, (Sep.).

Primary Examiner—Jeanette M. Hunter
Attorney, Agent, or Firm—Joseph T. Harcarik; Thomas R. Savoie; Daniel J. Donovan

[57] ABSTRACT

A process is disclosed for isolating and concentrating a natural colorant of bland taste found in plants containing betanin. The process involves adjusting the pH of an aqueous extract of the betanin-containing plant to the isoelectric point of betanin, contacting the pH-adjusted extract with a non-ionic adsorbent to concentrate the betanin pigment on the adsorbent, eluting the adsorbent to remove the betanin pigment, and separating the pigment from the eluting agent.

11 Claims, No Drawings

PROCESS FOR CONCENTRATING AND ISOLATING A BEET COLORANT

TECHNICAL FIELD

Colorants in foods are either natural pigments or synthetic dyes or lakes. Since the number of synthetic colors is limited, and the safety of some has been questioned, there is need to further explore natural pigments as colorants. More specifically, recent findings on the toxicity of artificial red food colorants has prompted extensive research in finding suitable natural red pigments as color additives.

Thus, the present invention is particularly described with respect to betanin, a natural red pigment; but it should be apparent to those skilled in the art that the teachings herein have other applications, for instance, to the isolation and concentration of other colorants from natural sources, such as plants, insects, marine life and the like. Illustrative colorants are anthocyanins from berries, cochineal from insects and spirulina-like, protein-bound colorants from seaweed.

The existence of the major red pigment, betanin, obtainable from the red beet (*Beta vulgaris*) is known, and it is also known that it lacks toxicity. Consequently, the beet has been the subject of much experimental interest in obtaining red pigment for use in the pharmaceutical, cosmetic and food industries.

One attempt to isolate and purify betanin, found in the red beet, involves an ion-exchange resin (acid form) separation process. See von Elbe, J. H. and Maing, I.-Y. "Betalains As Possible Food Colorants of Meat Substitutes," *Cereal Science Today*, 18:263 (1973) and Pasch, J. H. and J. H. von Elbe, "Betanin Degradation as Influenced by Water Activity." *Journal of Food Science* 40:1145 (1975). Quantitative yields are not reported.

Another attempt to isolate the red pigment in beet is disclosed in French Pat. No. 1,291,155 to Hoh. A. Benckiser Gmbh. Therein is described a process for filtering red beet extract through a cation exchanger, then through an anion exchanger prior to adsorbtion on an adsorbent resin from which the dye is extracted with ethyl alcohol. Quantitative yields and process details are not given.

U.S. Pat. No. 4,027,242 to von Elbe et al describes a fermentation process for the production of a beet pigment concentrate. The fermentation process reportedly results in a five to seven fold increase in betacyanine content on a dry basis compared to available commercial beet preparations having 0.4 to 1% red pigment. (Note: Betanin accounts for about 75 to 95% of the total betacyanine content of the beet.) Thus, the yield of purified pigment, using the fermentation process, is about 6–8% betacyanine content in the final dry product.

Another problem associated with the use of beet pigment to replace synthetic dyes is off-taste. Although the product resulting from the fermentation process is reportedly void of the characteristic beet flavor and aroma, it is not known whether off-flavors attributable to dimethylsulfide develop in the product on storage. It is known that presently available commercial beet preparations have beety off-flavors and relatively low pigment concentrations. Therefore, when using large quantities to achieve the desired tinctorial strength in a food product, the organoleptic properties of the food to which they are added are deleteriously affected.

In view of the foregoing, it would be highly desirable to obtain commercially significant quantities of a highly-concentrated, natural red colorant of bland taste which would remain free of any off-tastes that might develop after the product has been in the stream of commerce for a considerable period of time.

It is an object of the present invention to provide a highly-concentrated, natural colorant from naturally-occurring, edible foods suitable for use in the food, cosmetic and pharmaceutical industries. It is another object of this invention that the betanin pigment have a bland taste for extended periods of time.

DISCLOSURE OF THE INVENTION

The selective removal of betanin, a natural red vegetable pigment, from any vegetable extract containing betanin is accomplished by adjusting the pH of an aqueous extract of a betanin-containing plant to the isoelectric point of betanin, contacting the pH-adjusted extract with a non-ionic adsorption resin to concentrate the betanin pigment on the resin, eluting the resin to remove the betanin pigment, and separating the pigment from the eluting agent.

As used herein, the term "vegetable extract" is meant to include the liquid extract from any herbaceous plant whose fruit, seeds, roots, tubers, bulbs, stems, leaves or flower parts are used as food. This process is particularly suited to the extraction of betanin from red beet (*Beta vulgaris*) extracts. For purposes of description, whole beets, beet powder, and beet wastes will be treated as raw material, it being understood that the process is capable of being carried out with an aqueous solution of beets or beet wastes. The aqueous phase contains the pigment along with other water solubles, such as proteins, soluble pectins, and minerals or ash including salts, but in which the principal components are carbohydrates which are basically sucrose. Typically, the aqueous phase will contain the beet pigment in a concentration of about 0.5% by weight of the total solids; however, this process is applicable to a wide range of concentrations.

In order to effect removal of the water-soluble beet pigment from other water-soluble solid materials, such as proteins, the aqueous extract is adjusted to a pH near the isoelectric point of betanin. Betanin is an amphoteric substance which reaches its isoelectric point in a solution having a pH value of 2.0. However, satisfactory adsorption with nonionic resin is obtained when the pH values are in a range of from 1.5 to about 2.7.

Usually, the raw material for this invention is a vegetable extract having a pH adjusted to the range of from 4.2 to about 5, the pH value at which betanin is most stable. Therefore, to adjust the pH range to the optimum for this invention, acids selected from the group consisting of hydrochloric acid, phosphoric acid, citric acid, and the like are added in sufficient strength to lower the pH to between 1.5 to about 2.7.

The surprising and unexpected results achieved by this pH adjustment are the selective adsorption and concentration of pigment on the non-ionic resin which effectively isolates the pigment from other material in the extract. It is believed that this adsorption step permits the separation of certain proteins believed to be precursors of the dimethylsulfide (DMS) which create off-flavors in the pigment. Not only is a very effective isolation of pigment achieved, but the pigment, once adsorbed, is easily eluted from the resin, unlike adsorption with anionic and cationic resins which retain substantial amounts of the pigment after strenuous elution efforts.

Among the high surface area, non-ionic materials useful as betanin adsorbents herein are any of the known non-ionogenic, macroreticular resins. For example, there may be used the granular cross-linked polymers of this character pepared by suspension polymerization of polymerizable ethylenically unsaturated molecules comprising about 2 to 100, preferably at least 50, weight percent of at least one poly(vinyl) benzene monomer selected from the group consisting of divinylbenzene, trivinylbenzene, alkyldivinylbenzenes having from 1 to 4 alkyl groups of 1 to 2 carbon atoms substituted in the benzene nucleus and alkyltrivinylbenzenes having 1 to 3 alkyl groups of 1 to 2 carbon atoms substituted in the benzene nucleus. Besides the homoplymers and copolymers of these poly(vinyl)benzene monomers, one or more of them may be copolymerized with up to 98%, preferably less than 50%, (by weight of the total monomer mixture) of (1) monoethylenically unsaturated monomers (e.g., styrene), or (2) polyethylenically unsaturated monomers other than the poly (vinyl)benzenes just defined (e.g., divinylpyridine), or (3) a mixtue of (1) and (2). Macroreticular acrylic and/or styrene and/or divinylbenzene adsorption resins devoid of ion exchange functionality have proven particularly useful in the process of this invention.

Adsorbent resins of the aforementioned-type are known and commercially available and more fully described in U.S. Pat. No. 3,531,463 to Gustafson (Rohm & Haas Company) which is hereby incorporated by reference.

Typically, the adsorbent polymer, which under most conditions is of 16 to 100 mesh in particle size, and may be as small as about 400 mesh, has a porosity of at least 10% (percent volume of pores in the resin body or bodies) and a surface area of at least 10 square meters per gram of the resin (up to 2,000 square meters per gram). Cross-linked resins having solubility parameters (units: colories/cc)) of at least about 8.5 and up to 15 or more are suitable for use. The preferred resin size is from about 40-50 mesh (U.S. Standard).

Adsorption of betanin pigment may be carried out in a simple batch operation, in a continuous procedure, or in various other operating modes available to those skilled in the art. In a fixed-bed batch operation, the adsorbent may be supported in a suitable cell or vessel which in most practical operations normally takes the form of a tower or column suitably packed with the adsorbent which may be of any suitable size or mesh. The vegetable extract containing betanin is passed through the adsorption bed at a suitable rate, preferably from top to bottom so that betanin may be adsorbed.

When the red beet extract which normally has a solids content of about 15 to 30% by weight, normally about 0.5% of these solids being betanin, contacts the adsorbent, solids will be adsorbed until the adsorbtion capacity of the adsorbent medium in the particular system is reached. When betanin adsorption occurs in a single column, it will normally be the practice to cut off the flow of extract into the column before a significant amount of betanin is detected exiting from the column. In this manner, a substantially betanin-free extract is obtained which may be recycled for additional processing if desired.

In addition to betanin, various other compounds present in the vegetable extract are also adsorbed. For example, pigments, such as betanidin, isobetanidin and vulgaxanthin, and noncolor contributing compounds, such as polypeptides and solubilized proteins, have been identified in the adsorbed material. However, the phenomenal advantage of the process described herein is that the betanin pigment present in the aqueous extract is concentrated so that a 40 to 60 fold increase in tinctorial strength of the pigment is obtained. For example, the 0.5% betanin content in the solids of the aqueous extract reaches a concentration level of about 20% to 30% of the solids adsorbed on the resin and is easily eluted therefrom.

The adsorption bed containing the adsorbed betanin pigment is preferably rinsed with water in order to remove from the adsorbent particles solids which are merely adhered to the particle surfaces and have not, in fact, been adsorbed. In column operation, this water rinse will normally be effected by passing tap water (about 15° C.) through the adsorbent bed which is submerged in the vegetable extract. The solids-containing liquid forced out of the fed by the water rinse will be of sufficiently low betanin content that it may be discarded.

Adsorbed betanin pigment is eluted with water along or aqueous-alcohol mixtures. According to a preferred embodiment of this invention, essentially all of the adsorbed pigment is eluted from the resin when 10 to 30% by weight of the aqueous solution is methanol, ethanol, n-propanol, isopropanol or combinations thereof. An aqueous alcohol solution at a given flow rate, minimizes the amount of eluant required. A reduction in the amount of elution liquid employed, at any constant flow rate, is desirable in terms of the time and energy required not only for the elution operation but also for any operation wherein the eluant is recovered, by such means as distillation, for reuse.

As will be recognized as being conventional in the art, the eluted or regenerated adsorption bed will normally be rinsed with water in order to displace the elution medium. A final water wash in the reverse direction will normally be desirable in order to free the bed of entrapped solids and air and to present the bed in the most efficient condition for reuse.

The pigment-containing solids which exit from the adsorption bed in the elution stream may advantageously be treated with an alkaline substance to adjust the pH of the elution stream containing the betanin pigment to about 4.2 to about 5.0. The pH range between 4.2 and 5.0 provides a more stable environment for the betanin pigment. The sooner the pH is adjusted, the less degradation of the pigment. pH values above 6.5 are also avoided because pigment degradation is very rapid above this pH level; the pigment turns brown and undergoes an irreversible reaction.

In another aspect of the process of the present invention, the betanin pigment and other adsorbed solids are separated from the eluting agent. Separation is accomplished by any convenient means, e.g., distillation, evaporation, ultrafiltration, and the like. The eluting agent can be recycled for subsequent use, if desired. The product, containing a significant amount of betanin pigment, is still in a liquid form and suitable for use as a vegetable coloring agent.

In a preferred embodiment, the betanin pigment concentrate in liquid form is combined with one or more spray-drying aids, such as gum arabic and malto dextrins, or the solution may be encapsulated by standard coacervation techniques in edible materials using gelatin. Alternatively, the betanin pigment concentrate may be freeze-dried if cost is not a consideration. The object is to reduce the concentrate to a dry powder form, thereby further preserving the pigment and its tinctoral strength. The resulting dried product may then be added to foodstuffs, chewing gums or medicinal products in conjunction with other materials such as flavoring adjuvants.

This invention is further described by, but not limited by, the following examples:

EXAMPLE 1: Adsorption of Betanin from Vegetable Extract

A commercially-available beet extract (e.g., Beatrice "Color-Treme R-111" manufactured by Color-Treme Company, Division of Beatrice Foods, Beloit, Wisconsin) analyzed as having a pH of about 4.2 and containing 1.67 grams of betanin at a concentration of 0.5% betanin based on total solids (68%) is treated with water and 1 molar hydrochloric acid to reduce the total solids content to about a 25% level and lower the pH of the extract to the isoelectric point (pH=2) of betanin. The resulting solution contains 0.125% betanin. For five hours, at temperatures between 10° C.–30° C., approximately 1 bed volume per hour of the dilute, pH-adjusted beet extract is passed through a fixed bed (2.5 cm diameter by 120 cm high) of a nonionic, high surface area, macroreticular, styrene-divinylbenzene copolymer, prepared by suspension polymerization of a monomer fraction containing in excess of 80% by weight divinylvenzene. This adsorbent polymer is employed in the form of 20 to 50 U.S. mesh size beads and is available from Rohm and Haas Co., Philadelphia, PA 19105 under the commercial designation "Amberlite XAD-4." Thereafter, 2 bed volumes of water, at about 15° C., are passed through the resin bed at the rate of 1 bed volume per hour to remove non-adsorbed solids.

The resin bed is then eluted at about 15° C. with an elution medium consisting of 80% water and 20% isopropyl alcohol for 2 hours at 2 bed volumes per hour.

Immediately after elution, the elution stream is adjusted to a pH of 4.5 with potassium hydroxide.

The elution stream is analyzed using visible light spectroscopy and is found to contain 0.278% betanin based on total weight of liquid. The elution stream, containing betanin, is fed to an evaporator where it is further concentrated and separated from the eluting agent. A liquid concentrate containing 4.49% betanin based on total liquid is recovered from the bottom of the evaporator.

The liquid betanin concentrate is mixed with a carbohydrate carrier (e.g., Fro-Dex, trademark of American Maize Products Company) on a 1:1 solids ratio and spray dried to form a dry powder.

The spray-dried powder is analyzed by spectrophotometric analysis and contains 12.43% betanin based on total solids, including 50% starch carrier. Without the starch carrier, the liquid concentrate reduced to a dry powder contains 25% betanin and 75% other solids.

EXAMPLES 2-8: Adsorption at Various pH Ranges

Following the procedure described in Example 1, aliquots of dilute, pH-adjusted beet extract, containing 0.125% betanin, are reduced to a spray-dried powder. Each aliquot contains a total of 1.67 grams of betanin on a dry basis. Various pH levels are used to test the adsorption efficiency of the resin. The results are shown in Table I below.

TABLE I

Adsorption of Betanin at Various pH Ranges Using XAD-4 Nonionic Resin

| Example No. | pH Before Adsorption | % Betanin Adsorbed |
|---|---|---|
| 2 | 1.7 | 87.7 |
| 3 | 1.9 | 87.4 |
| 4 | 2.0 | 94.0 |
| 5 | 2.15 | 88.0 |
| 6 | 2.55 | 84.0 |
| 7 | 2.7 | 82.3 |
| 8 | 4.2 | 56.0 |

The above results demonstrate that betanin adsorption on the nonionic resin of this invention is highest near the isoelectric point, pH=2, of betanin.

EXAMPLES 9-12: Batch Elution Results

As described in Example 1, a spray-dried betanin pigment is prepared except that various concentrations of water and isopropyl alcohol are used as eluting agents. The betanin desorbed is expressed as a percentage by weight of the amount adsorbed on the resin bed. As in Example 1, the eluting agent is evaporated from the betanin pigment and other solids; the dried powder is analyzed for betanin, on a dry basis, and parts per million (ppm) dimethylsulfide (DMS). DMS is found to contribute undesirable off-flavors to foods containing the betanin powder concentrate; therefore, very low or no detectable level of DMS is preferred. The efficacy of each eluting composition is reported in Table II below.

TABLE II

Elution of XAD-4 Resin Containing Betanin

| | Eluting Agent | | | % Betanin (dry basis) | DMS (ppm) | |
|---|---|---|---|---|---|---|
| Example No. | % Isopropyl Alcohol | % Water | % Betanin Desorbed | | 30° C. | 100° C. |
| 9 | 0 | 100 | 12.3 | 21.3 | 2.09 | 4.71 |
| 10 | 20 | 80 | 74.0 | 16.6 | .22 | 2.10 |
| 11 | 60 | 40 | 56.0 | 17.1 | .41 | 1.21 |
| 12 | 100 | 0 | 30.8 | 5.6 | .07 | .32 |

The above data show that water alone is not very effective for removing the adsorbed betanin pigment. The relatively small amount of solids removed have a 21.3% concentration of betanin and DMS concentrations at higher levels than with mixtures of water and alcohol or alcohol alone as eluting agents.

However, 20% isopropyl alcohol and 80% water (20% IPA) is most efficient in the removal of the adsorbed pigment from the resin and the DMS concentration is at an acceptable level. Thus the 20% IPA elutant gives the largest yield (74) of betanin and a powder with a betanin concentration greater than 16% which is essentially free of off-flavors.

EXAMPLES 13-14: Efficacy of XAD-4 Resin in Separating DMS from Betanin Pigment

Using the commercially-available beet extract of Example 1 as a control, three samples containing different concentrations of betanin, all products of this invention, are analyzed for free DMS at 30° C. and DMS potential at 100° C. via headspace gas chromatography (G.C.).

The following solutions are prepared:

| Sample No. | |
|---|---|
| Control | 15 grams of 68° Brix Beatrice beet extract is diluted with 100 ml of distilled water to make a 10% solution containing 0.05% betanin. |
| A | Liquid concentrate of Example 1 containing 2.0% betanin in a 10% solution. |
| B | 0.4 grams of spray-dried powder of Example 1 dissolved in 4 ml of 1 Molar NaOH solution containing 1% betanin. |

Four ml of each sample are placed in quadruplicate vials. To make all samples alkaline, one pellet of NaOH (0.16 grams) is placed in the vials containing sample A and the control. In preparation for the analysis, the vials are sealed with screw caps having bonded silicone teflon disc apertures. Two vials of each sample are held for one hour at 30° C. The other two vials of each sample are heated for 2 hours at 100° C. followed by 1 hour equilibration at 30° C. for DMS potentials.

The column entitled, "DMS Potential at Same Tinctorial Strength" in Table III gives a comparison of DMS potential on a practical level. These data emphasize that the natural colorant produced herein is in a concentrated form and can be normalized based on color content before use. For example, Sample A contains 2.0% betanin; therefore, it is 40 times more concentrated than the control sample. Thus, 1/40 as much of Sample A is required to achieve the same tinctorial strength as the control. Sample B is 20 times more concentrated than the control; therefore, the quantity of Sample C used as a colorant is 1/20 as much as the quantity of control used.

Results of the G.C. headspace analysis are given in Table III:

TABLE III

| Example No. | Sample | % Betanin | Magnitude of Tinctorial Strength over Control | Free DMS 30° C. | DMS Potential 100° C. | DMS Potential at same Tinctorial Strength |
|---|---|---|---|---|---|---|
| | Control | .05 | 1 | 4 | 170 | 170 |
| 13 | A | 2.0 | 40 | 0 | 43 | 1 |
| 14 | B | 1.0 | 20 | 0 | 24 | 1 |

The above data indicate that when the betanin pigment of this invention is used and stored at temperatures below 30° C., it does not develop off-flavors resulting from dimethylsulfide. When the betanin pigment is used in the same tinctorial strength as the control, the potential for the development of off-flavors from DMS is reduced more than 100-fold in the liquid concentrates and spray dried powder (Sample B) of this invention.

We claim:

1. A process for the concentration and isolation of betanin pigment from an aqueous extract of a plant containing betanin comprising the steps of lowering the pH of said aqueous extract to 1.5 to about 2.7, contacting the pH-adjusted extract with a nonionic adsorbent so that the betanin pigment concentrates on the adsorbent, eluting the adsorbent to remove the betanin pigment from the adsorbent to an eluting agent, and separating the pigment from the eluting agent.

2. The process of claim 1 wherein the pH of the aqueous extract is lowered within the range of 1.9 to 2.2.

3. The process of claim 1 wherein the aqueous extract of the plant containing betanin contains the vegetable pigment in a concentration within the range of 0.1 to 10% based on weight of the total solids.

4. The process of claim 1 wherein the nonionic adsorbent is comprised of non-ionogenic, macroreticular, cross-linked resin particles.

5. The process of claim 4 wherein the adsorbent is an acrylic, styrene, divinylbenzene or combination thereof resin.

6. The process of claim 4 wherein the adsorbent resin is a divinylbenzene polymer or a styrene/divinylbenzene copolymer.

7. The process of claim 6 wherein the adsorbent resin is a polystyrene monomer crosslinked with divinylbenzene in the form of 20 to 50 mesh-size beads.

8. The process of claim 1 wherein the eluting agent is selected from the group consisting of water, $C_1$ to $C_3$ primary alcohols and mixtures thereof.

9. The process of claim 8 wherein the eluting agent is about 20% isopropanol and about 80% water.

10. The process of claim 1 wherein the separated pigment is reduced to dry powder having a betanin concentration of from 15 to 30% concentration by weight based on weight of the total solids.

11. A product according the claim 1.

* * * * *